(No Model.)

M. P. M. DAVIS.
PLOW.

No. 515,752. Patented Mar. 6, 1894.

WITNESSES: INVENTOR.
Martin P. M. Davis,
by James Sagan & Co.
Attorneys.

UNITED STATES PATENT OFFICE.

MARTIN P. MARSHAL DAVIS, OF EZEL, KENTUCKY.

PLOW.

SPECIFICATION forming part of Letters Patent No. 515,752, dated March 6, 1894.

Application filed May 27, 1893. Serial No. 475,743. (No model.)

*To all whom it may concern:*

Be it known that I, MARTIN P. MARSHAL DAVIS, a citizen of the United States, and a resident of Ezel, in the county of Morgan and State of Kentucky, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification.

My invention relates to improvements in reversible plows, in which the cutting apparatus may be reversed so that when the plow is used as a side hill plow, the furrows can all be turned in the same direction.

The invention consists in the novel construction and combination of parts, hereinafter fully described and claimed.

Figure 1:
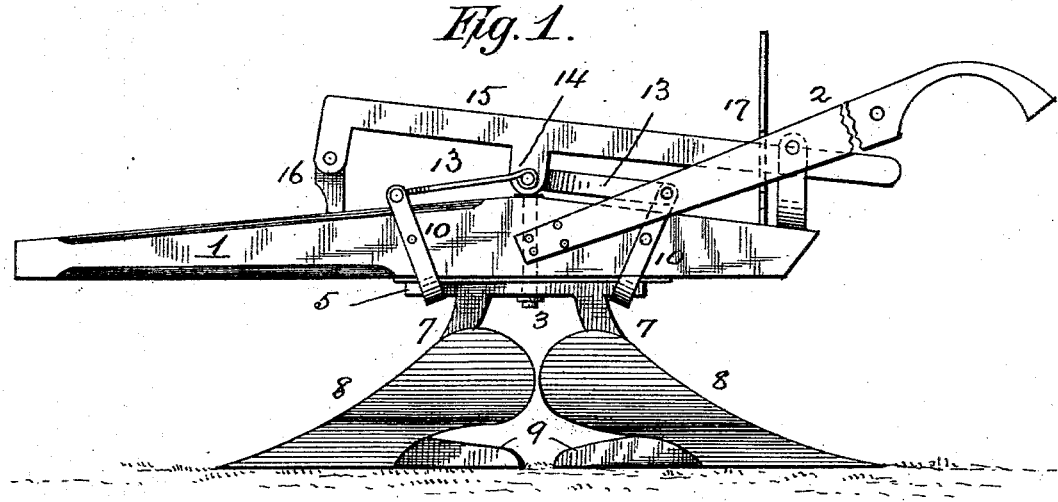
Figure 2:
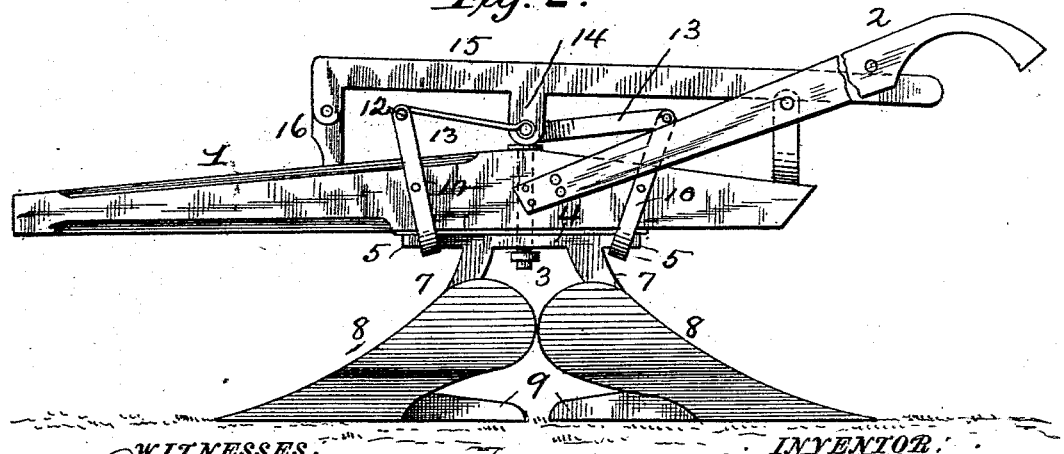

In the accompanying drawings: Figure 1 is a side view of a plow constructed in accordance with my invention. Fig. 2 is a similar view, showing a modified construction of the same.

In the said drawings, the reference numeral 1 designates the beams, and 2 the handles. Pivoted to the beam, by means of a bolt 3, is the frame 4, consisting of the horizontal plate 5 and curved standards 7. To these standards are secured the mold board 8, and land side 9, which are reversely arranged, or pointing in opposite directions.

Pivoted to the beam 1, at each side of the center of the frame 4, is a bail 10, which is adapted to engage with the ends of the horizontal plate 5, and prevent any lateral movement thereof. The upper ends of these bails are connected by means of bolts 12, to which are pivoted the inwardly extending arms 13, which are pivoted to a lug 14 on a lever 15, pivoted to a lug 16 secured to the plow beam. The rear or free end of lever 15, is adapted to engage with a vertical rack bar 17 secured to the beam 1 for the purpose of locking the same.

The operation will be readily understood. In commencing to plow a field, the frame 1 is adjusted so that the cutting apparatus will throw the furrow in the proper or desired direction, and the frame locked in place by means of the bails, arms and lever. When the end of the furrow is reached, the lever is depressed, causing the bails to be disengaged from the plate 5, which latter is turned on its pivot, so as to present the oppositely arranged cutting apparatus. The frame is then locked and the plow is now run back, the draft animal walking in the furrow just cut. By this construction and arrangement, the furrows will all be turned to the same side, no matter in which direction the animal is traveling.

In the modification shown in Fig. 2, the rack bar 17, is dispensed with, the lug 14 extending down below the centers of the pivots of arms 13. By this means the bail will be securely held in place.

Having thus described my invention, what I claim is—

In a reversible plow, the combination with the beam, the frame pivoted thereto having the double standards with the opposite or reversely arranged cutting apparatus secured thereto, of the pivoted bails the inwardly extending arms pivoted thereto, the lever pivoted at its front end to the plow beam and provided intermediate its ends with a downwardly depending lug to which said arms are pivoted, the construction being such that when said lever is depressed the inner ends of said arms will be depressed below their pivotal points with the bails, so as to hold the latter in engagement with the said frame, substantially as described.

In testimony that I claim the foregoing as my own I have hereunto affixed my signature in presence of two witnesses.

MARTIN P. MARSHAL DAVIS.

Witnesses:
WILLIAMSON B. LYKINS,
PORTER EASTERLING.